United States Patent Office 3,337,616
Patented Aug. 22, 1967

3,337,616
PREPARATION OF SALICYLIC ACIDS
Warren W. Kaeding, Concord, Calif., and Edwin J. Strojny, Midland, Mich., assignors to The Dow Chemical Company, Midland, Mich., a corporation of Delaware
No Drawing. Filed Dec. 18, 1964, Ser. No. 419,563
4 Claims. (Cl. 260—521)

This invention relates to a new chemical process. It relates particularly to a method for making a salicylic acid by the thermal rearrangement and oxidation of the corresponding cupric benzoate.

It is known that the thermal decomposition of cupric benzoate yields a complex mixture of products from which some salicylic acid can be separated. Bamdas and Shemyakin, Zhur. Obshchei Khim., 18, 324 (1948), heated solid cupric benzoate in an inert atmosphere to obtain a mixture of which the organic portion was largely benzoic acid and benzoic anhydride with some salicylic acid, phenyl benzoate, and a little phenol. Kaeding et al., End. Eng. Chem., 53, 805 (1961), thermally decomposed cupric benzoate in benzoic acid or other aromatic solvent medium to produce phenol or phenyl benzoate, depending on the presence or absence of water in the reaction mixture. Traces of salicylic acid or benzoylsalicylic acid were found in the reaction mixtures and the authors postulated that these compounds were formed as transitory intermediates in a series of chemical reactions which apparently take place more or less simultaneously. No substantial concentration of a salicylate was found in such a reaction mixture nor did it appear likely that any such concentration could be formed because of rapid decarboxylation to the phenol or the phenyl benzoate.

Therefore, it is surprising and unexpected that heating a cupric benzoate at about 200–300° C. in an inert, non-aromatic solvent dispersion or solution produces the corresponding salicylate as the main reaction product, and it is further remarkable that the yield of salicylate is substantially increased by combining the above operation with a step wherein the reaction mixture is contacted with an oxygen-containing gas. This oxidation step can be carried out at any temperature where the reaction mixture remains liquid and the solvent is not significantly attacked by oxygen. Thus, the oxidation can be concurrent with the heating step or it can be done at a lower temperature on the heated mixture in a cyclic type of operation. The salicylate product is present as an insoluble copper salt in the cooled reaction mixture and so is easily separated. The acid product obtained from the copper salt is essentially the salicylic acid containing some of the original benzoic acid which is separable by known purification procedures.

This new process is applicable to the production of salicylic acids of the formula

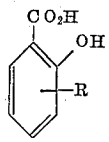

wherein R is hydrogen, alkyl, alkoxy, fluoro, or nitro. By alkyl and alkoxy is meant the unsubstituted radicals of one to about twenty carbon atoms. The term cupric salt is used herein in reference to these salicylic acids and the corresponding benzoic acids to define the normal cupric salt and excludes the basic cupric salt.

Reaction media which are suitable for the present process include alkanes and cycloalkanes of about six to about thirty carbon atoms and their fluorinated derivatives. Perfluorinated saturated hydrocarbons, the fluorocarbons, are particularly advantageous because of their resistance to oxidation at elevated temperatures. Mixtures of two or more such compounds may be employed. Preferably, the medium is liquid at normal room temperatures. Materials such as cyclohexane, methylcyclohexane, decahydronaphthalene, hexane, decane, octadecane, eicosane, and triacontane are representative of the hydrocarbon media. Petroleum fractions consisting essentially of mixtures of such compounds are also suitable. Fluorinated hydrocarbons such as fluorocyclohexane, perfluorodecahydronaphthalene, 1,8-difluorooctane, dodecafluorodecane, 1,16-difluorohexadecane, and (tetrafluoroethyl) cyclohexane are representative fluorinated alkanes and cycloalkanes of the class described.

Apparently, in mixtures with inert aliphatic and cycloaliphatic media of the class described above, where there is present no substantial quantity of protic substances such as water or free benzoic acid, the rearrangement and self-oxidation of a cupric benzoate proceeds to the salicylate stage in a manner similar to the reaction in a protic system, but the further decarboxylation of the copper salicylate or benzoylsalicylic acid, which is a very rapid reaction in the latter system, is essentially completely blocked in the aprotic inert reaction medium. The salicylate produced, therefore, instead of being a transient intermediate, becomes the stable principal product of the reaction.

The quantity of reaction medium is not a critical factor although it is obviously desirable to use enough to maintain the reaction mixture in a suitably fluid state. About 0.5–5 liters per gram mole of cupric benzoate has been found to provide an easily handled reaction mixture.

The copper salts used for this reaction may be conveniently prepared in situ simply by the addition of copper carbonate, basic copper carbonate, copper hydroxide, or oxides of copper, to a solution of the aromatic acid in the reaction solvent. The use of oxides of copper provides a convenient method for the recycle of copper to the system in a process. Cupric oxide is the preferred form, however, cuprous oxide, in the presence of air may also be used.

The cupric salt of the aromatic acid need not be completely dissolved in the reaction medium. A suspension of the cupric salt appears to react as it dissolves to produce the insoluble cuprous salicylate. The quantity of cupric salt in the system is limited only by the practicality of handling the resultant slurry.

The oxidation step is carried out by contacting the fluid reaction mixture with gaseous oxygen, either alone or in a mixture with an inert gas such as nitrogen or carbon dioxide. A convenient method comprises bubbling air through the liquid solution or dispersion. Preferably, oxygen in excess of one mole per mole of starting benzoic acid is employed. The oxidation can be carried out at any temperature where the reaction mixture is substantially liquid, but a temperature of 100–300° C. is preferred. The sensitivity of the reaction solvent to oxidation largely determines both the temperature at which the oxidation step is operated and the manner in which the whole process is carried out. For example, when a fluorinated hydrocarbon is the reaction medium, its high resistance to oxidation permits running the thermal decomposition and the oxidation steps simultaneously in a single reactor where the reaction mixture is contacted with oxygen at 200–300°. When an alkane or cycloalkane is employed, it is necessary to run the oxidation step at a lower temperature to avoid excessive solvent oxidation. This can be accomplished in a single reactor by heating the reaction mixture to 200–300° C., thereby carrying out the decomposition or rearrangement step, then cooling the mixture to a suitable temperature, for example, 100–200° C., and contacting the mixture with oxygen. Best results are obtained when this cycle of operation is repeated several times. A more convenient mode of operation using two temperature ranges is illustrated by a two reactor system wherein the reaction mixture is circulated, and preferably recirculated, from the higher temperature reactor to the lower. The principal advantage in the use of oxygen is the substantial increase in conversion to the desired salicylic acid product.

Where the operating temperature is above the normal boiling point of the reaction medium the system is operated under superatmospheric pressure to maintain the liquid state. The autogenous pressure of the system is preferred.

For larger scale operation, any of the above procedures is best run in a continuous manner by continuously withdrawing portions of the reaction mixture for processing to separate salicylic acid from the copper salts and continuously returning to the system recovered solvent, copper, and benzoic acid plus added benzoic acid to replace the converted material, thereby maintaining an approximately constant balance in the system of two moles of benzoic acid to one atom of copper. Copper can be returned to the system as the benzoate, as a copper oxide, or as a compound convertible to the oxide on heating such as copper hydroxide or copper carbonate. Any small amounts of water formed by the reaction of copper oxide with benzoic acid are rapidly vaporized and distilled from the vented reaction vessel before continuing with the reaction.

The work-up of the reaction mixture and the recovery of the salicylic acid product are greatly simplified by the fact that the copper salts of salicylic and benzoic acids which comprise nearly all of the solids content are not significantly disolved by the process solvent at ordinary temperatures and these salts are, therefore, easily and completely separated by filtration or decanting. The liquid portion is essentially pure solvent which may contain small quantities of dissolved benzoic anhydride, free benzoic acid, and related compounds and this recovered reaction medium can be returned directly to the process.

The solid copper salts separated from the reaction mixture can be worked up by any of several conventional procedures to obtain the product salicylic acid, unreacted benzoic acid, and the copper in a form suitable for return to the main process. For example, the copper salts can be reacted with aqueous sodium hydroxide to obtain copper hydroxide and the sodium salts of the acids. Alternatively, the copper salts may be digested with a strong mineral acid to produce the organic acids directly. The copper salt thereby made is then reacted with alkali to make a hydroxide or oxide which can be reused in the process. Pure salicylic acid can be obtained from the mixed acid product by any of several known techniques, for example, fractional crystallization, preferential absorption by an ion exchange resin, or by contacting an organic solvent solution of the mixed acids with aqueous ferric chloride whereupon the salicylic acid forms a ferric chloride complex in the aqueous phase while the benzoic acid remains dissolved in the organic solvent.

*Example 1*

The reactor was a vertical glass cylindrical vessel equipped with electrical means for measuring and controlling the temperature. A gas inlet tube extended to near the bottom of the reactor. Other openings in the reactor included a product sampling port at the bottom, a loading port at the top, and an outlet port at the top which was vented through an air-cooled reflux condenser and a drying tube.

The reactor was charged with 1248 g. of mineral oil (approximate boiling range 300–400° C.) and 100 g. of benzoic acid. This mixture was heated to about 180° C. and 49.4 g. of basic cupric carbonate

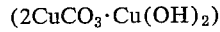

$$(2CuCO_3 \cdot Cu(OH)_2)$$

was added to make a slurry of cupric benzoate in the oil. A stream of nitrogen swept the water of reaction out of the system. The resulting anhydrous slurry of cupric benzoate in mineral oil was then subjected to alternate steps of heating for about 30 minutes at 210–260° C. in a nitrogen atmosphere and oxidizing for about 10 minutes at 175–216° C. with a stream of 4 liters per minute of air bubbling through the reaction mixture.

Each heating and oxidation step was continued until the reaction involved was indicated to be substantially complete. In the heating step, completion of reaction was visually determined as the time when the color of the reaction mixture had changed from blue or green to a brown or bronze color. The end of the oxidation was taken as the point where the oxygen content of the effluent air had risen above about 20%.

Five grams of benzoic acid was added to the reaction mixture during each of the fourth and fifth oxidation steps. This cyclic mode of operation was continued for a total of ten such cycles, the temperature being increased in successive heating steps so that most of the decomposition steps were conducted at 240–260° C. It was found that the decomposition of the cupric benzoate as evidenced by the change in color of the mixture from blue-green to bronze took place at a convenient rate at these higher temperatures. Beginning with the second heating step, a sample of the reaction mixture was abstracted at the end of each heating step and the copper salts therein were separated and analyzed for salicylic acid content. The analytical results were as follows, the salicylic acid content being expressed as weight percent of the organic portion of the copper salts. The increase in conversion of benzoic acid by the use of air is illustrated.

| Cycle No.: | Percent salicylic acid |
| --- | --- |
| 2 | 24.7 |
| 3 | 40.3 |
| 4 | 44.7 |
| 5 | 49.8 |
| 6 | 54.2 |
| 7 | 63.1 |
| 8 | [1] 44.3 |
| 9 | 63.8 |
| 10 | 62.6 |

[1] Sample was defective.

The addition of free benzoic acid in cycles 4 and 5 apparently had no substantial effect on the results.

*Example 2*

In a system similar to that described in Example 1, 2.16 g. moles of benzoic acid was reacted with an equivalent quantity of baisic cupric carbonate to form cupric benzoate. The dried reaction mixture was then heated at a temperature varying cyclically from about 210° C. to about 240° C. while a stream of 4 liters per minute of air was bubbled through it. During this period, an additional 0.5 g. mole of free benzoic acid was added in small increments in the lower temperature portions of the heating cycles. The overall distribution of heating times was as follows:

| | Minutes |
| --- | --- |
| 210–220° C. | 85 |
| 220–230° C. | 190 |
| 230–240° C. | 15 |

The final reaction mixture was found to contain 0.65 g. mole of salicyclic acid and 1.98 g. mole equivalents of benzoic acid present as benzoic acid, benzoic anhydride, and esters, e.g., phenyl benzoate.

*Examples 3–9*

Using an apparatus and procedure such as described in Example 1, samples of cupric benzoate and substituted cupric benzoates were heated for 10–50 minutes in various alkane and cycloalkane media to obtain salicylic acid or the corresponding substituted salicylic acid.

| Cupric Salt | Reaction Medium | Temp., °C. |
|---|---|---|
| Benzoate | Cyclohexane | 255 |
| o-Toluate | Mineral oil | 210 |
| p-Tert-butylbenzoate | ----do---- | 250 |
| m-Nitrobenzoate | ----do---- | 255 |
| Benzoate | n-Decane | 250 |
| Do | Decalin | 250 |
| Do | Methylcyclohexane | 250 |

In each case, the benzoate was heated until there was evidence of reaction and the copper salts were then separated and analyzed to find the salicylic acid product. Each benzoate yielded a corresponding salicylic acid, for example, cupric o-toluate produced the 6-methylsalicylate, cupric p-tert-butylbenzoate produced the 4-tert-butylsalicylate, and cupric m-nitrobenzoate produced the 5-nitrosalicylate and a little of the 3-nitro isomer. In the same way, cupric o-methoxybenzoate is heated to form the 6-methoxysalicylate, cupric p-butoxybenzoate yields the 4-butoxysalicylate, cupric p-fluorobenzoate produces the 4-fluorosalicylate, and so on. In all cases, the total quantity of salicylate ultimately obtained is substantially improved by contacting the reaction mixture with oxygen in a manner such as previously described.

By using a fluorinated derivative of an alkane or cycloalkane such as shown as the reaction medium, similar results are obtained and it is also often possible to run the thermal rearrangement and reoxidation steps simultaneously, thereby dispensing with the cyclic operation, because of the greater resistance of these materials to oxidation at reaction temperatures. The corresponding perfluoronated derivatives, the fluorocarbons, are particularly advantageous in this respect.

We claim:

1. A process for making a salicylic acid of the formula

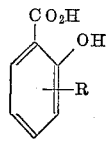

wherein R is selected from the group consisting of a hydrogen atom, alkyl of 1–20 carbon atoms, alkoxy of 1–20 carbon atoms, fluoro and nitro, which process comprises forming a fluid mixture of the cupric salt of the corresponding non-hydroxylated benzoic acid and a reaction medium selected from the group consisting of alkanes and cycloalkanes of about six to about thirty carbon atom and their fluorinated derivatives, heating said fluid mixture at about 200–300° C., contacting the mixture with an oxygen-containing gas, and separating a salicylate from said mixture.

2. A process for making salicylic acid which comprises heating a fluid mixture of cupric benzoate and a fluorinated saturated hydrocarbon of about 6–30 carbon atoms at about 200–300° C. while intimately contacting said mixture with gaseous oxygen, separating copper salicylate from the mixture, and converting said copper salicylate to salicylic acid.

3. A process for making salicylic acid which comprises heating a fluid mixture of cupric benzoate and a saturated hydrocarbon of about 6–30 carbon atoms at about 200–300° C., adjusting the temperature of said mixture to about 100–200° C., contacting the mixture at about 100–200° C. with gaseous oxygen, separating copper salicylate from said mixture, and converting said copper salicylate to salicylic acid.

4. The process of claim 3 wherein the fluid mixture is alternately heated at 200–300° C. and contacted with oxygen at 100–200° C. for at least two such cycles.

No references cited.

LORRAINE A. WEINBERGER, *Primary Examiner.*

S. WILLIAMS, *Assistant Examiner.*